United States Patent
Park et al.

(10) Patent No.: US 8,501,042 B2
(45) Date of Patent: Aug. 6, 2013

(54) PHOSPHOR, WHITE LIGHT EMITTING DEVICE INCLUDING THE PHOSPHOR AND METHOD OF PREPARING THE PHOSPHOR

(75) Inventors: Shang-hyeun Park, Yongin-si (KR); Bong-je Park, Daejeon (KR); Duk-young Jeon, Daejeon (KR); Tae-won Jeong, Yongin-si (KR); Ji-yon Han, Gwangju (KR)

(73) Assignees: Samsung Electronics Co., Ltd. (KR); Korea Advanced Institute of Science and Technology (KR)

( * ) Notice: Subject to any disclaimer, the term of this patent is extended or adjusted under 35 U.S.C. 154(b) by 405 days.

(21) Appl. No.: 12/815,863

(22) Filed: Jun. 15, 2010

(65) Prior Publication Data
US 2011/0073808 A1    Mar. 31, 2011

(30) Foreign Application Priority Data

Sep. 25, 2009 (KR) .................. 10-2009-0091150

(51) Int. Cl.
*C09K 11/54* (2006.01)
*C09K 11/56* (2006.01)

(52) U.S. Cl.
USPC ................................................. 252/301.6 S

(58) Field of Classification Search
USPC ..................... 252/301.6 S, 301.4 S
See application file for complete search history.

(56) References Cited

U.S. PATENT DOCUMENTS

| | | | |
|---|---|---|---|
| 6,248,261 B1 | 6/2001 | Takemura et al. | |
| 2004/0207998 A1* | 10/2004 | Suehiro et al. | 362/84 |
| 2006/0199900 A1* | 9/2006 | Matsumoto et al. | 524/556 |
| 2007/0194279 A1* | 8/2007 | Peng et al. | 252/301.4 F |
| 2009/0020897 A1* | 1/2009 | Winkler et al. | 264/1.22 |
| 2009/0110908 A1* | 4/2009 | Park et al. | 428/323 |

FOREIGN PATENT DOCUMENTS

| | | |
|---|---|---|
| JP | 05179242 A | 7/1993 |
| KR | 1020020017106 A | 3/2002 |
| KR | 1020070111553 A | 11/2007 |

* cited by examiner

*Primary Examiner* — Emily Le
*Assistant Examiner* — Lynne Edmondson
(74) *Attorney, Agent, or Firm* — Cantor Colburn LLP

(57) ABSTRACT

A phosphor represented by Formula 1:

$$ZnS:Cu,Cl,Mn,Te. \quad \text{Formula 1}$$

22 Claims, 2 Drawing Sheets

PHOSPHOR, WHITE LIGHT EMITTING DEVICE INCLUDING THE PHOSPHOR AND METHOD OF PREPARING THE PHOSPHOR

CROSS-REFERENCE TO RELATED APPLICATIONS

This application claims priority to Korean Patent Application No. 10-2009-0091150, filed on Sep. 25, 2009, and all the benefits accruing therefrom under 35 U.S.C. §119, the content of which in its entirety is herein incorporated by reference.

BACKGROUND

1. Field

The present disclosure relates to a phosphor, a white light emitting device including the phosphor, and a method of preparing the phosphor.

2. Description of the Related Art

An electroluminescent device is an active solid state display device. In an electroluminescent device a material emits light by electroluminescence ("EL") when an electric field is applied thereto. A dispersion type electroluminescent device includes an emissive layer which includes an electroluminescent phosphor distributed in a dielectric substance, and electrodes installed on opposite surfaces of the emissive layer. In addition, a dispersion type electroluminescent device emits light by supplying an alternating current to the electrodes.

A dispersion type electroluminescent device may be a planar light source, may be easily used in a flexible substrate, and may be formed to provide a large-size screen. A dispersion type electroluminescent device may be easily manufactured using a printing process, and may have a good resistance to temperature change. In addition, a dispersion type electroluminescent device may have lower power consumption as compared to other display devices.

A dispersion type electroluminescent device may use green and blue electroluminescent phosphors, for example, ZnS:Cu and Cl, to emit green light and blue light. However, there remains a need for a red light emitting electroluminescent phosphor. Because there remains a need for a red light emitting electroluminescent phosphor, current dispersion type electroluminescent devices use, for example, a photoluminescent phosphor to provide red light.

Accordingly, there a need remains for an electroluminescent phosphor that is capable of emitting red light.

SUMMARY

Provided is a phosphor.

Provided is a white light emitting device including the phosphor.

Provided is a method of preparing the phosphor.

Additional aspects will be set forth in part in the description which follows and, in part, will be apparent from the description.

According to an aspect is a phosphor represented by Formula 1:

In an embodiment the phosphor is represented by Formula 2:

wherein $0<v<0.05$, $0<w<0.05$, $0.01 \leq x \leq 0.1$ and $0.0008 \leq y \leq 0.03$.

Also disclosed is a white light emitting device including: a phosphor of Formula 1:

$$ZnS:Cu,Cl,Mn,Te. \qquad \text{Formula 1}$$

According to another aspect, a method of preparing a phosphor includes mixing a copper and chlorine activated zinc sulfide phosphor, a manganese precursor, and a tellurium precursor to obtain a first mixture, sintering the first mixture; pulverizing the sintered first mixture to form a pulverized material; mixing the pulverized material and a first copper precursor to obtain a second mixture; and sintering the second mixture to form the phosphor.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Figure 1:
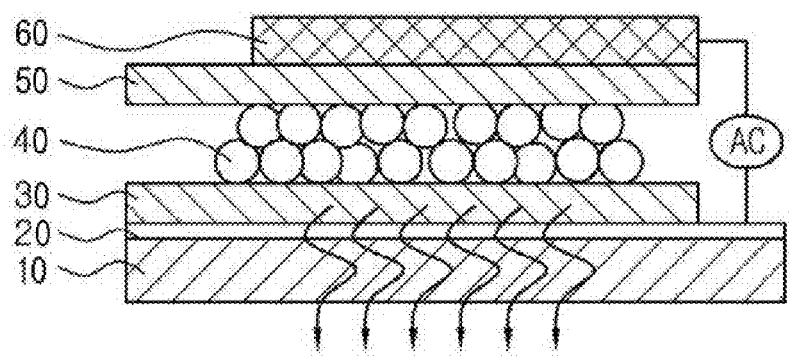
FIG. 1 is a schematic diagram of an exemplary embodiment of an electroluminescent device.

Reference will now be made in detail to embodiments, examples of which are illustrated in the accompanying drawings, wherein like reference numerals refer to the like elements throughout. In this regard, the present embodiments may have different forms and should not be construed as being limited to the descriptions set forth herein. Accordingly, the embodiments are merely described below, by referring to the figures, to explain aspects of the present disclosure.

It will be understood that when an element is referred to as being "on" another element, it can be directly on the other element or intervening elements may be present therebetween. In contrast, when an element is referred to as being "directly on" another element, there are no intervening elements present. As used herein, the term "and/or" includes any and all combinations of one or more of the associated listed items.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer, or section from another element, component, region, layer or section. Thus, a first element, component, region, layer, or section discussed below could be termed a second element, component, region, layer, or section without departing from the teachings of the present disclosure.

The terminology used herein is for the purpose of describing particular embodiments only and is not intended to be limiting. As used herein, the singular forms "a," "an" and "the" are intended to include the plural forms as well, unless the context clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another elements as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

Unless otherwise defined, all terms (including technical and scientific terms) used herein have the same meaning as commonly understood by one of ordinary skill in the art to which this invention belongs.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

Hereinafter, a phosphor, a white emitting device including the phosphor, and a method of preparing the phosphor will be further described with reference to the drawings.

A phosphor according to an embodiment is represented by Formula 1:

    ZnS:Cu,Cl,Mn,Te.    Formula 1

In an embodiment, the phosphor is represented by Formula 2:

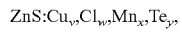
    $ZnS:Cu_v,Cl_w,Mn_x,Te_y$,    Formula 2 wherein $0<v<0.05$, $0<w<0.05$, $0.01 \leq x \leq 0.1$, and $0.0008 \leq y \leq 0.03$. In another embodiment, $0.0001<v<0.04$, $0.0001<w<0.04$, $0.02 \leq x \leq 0.09$, and $0.001 \leq y \leq 0.02$. In yet another embodiment, $0.001<v<0.03$, $0.001<w<0.03$, $0.03 \leq x \leq 0.08$, and $0.005 \leq y \leq 0.01$.

In an embodiment, v, w, x and y represent the respective molar ratios of Cu, Cl, Mn, and Te with respect to 1 mole of ZnS. For example, x and y may be $0.02 \leq x \leq 0.08$ and $0.002 \leq y \leq 0.02$, respectively.

In the phosphor, ZnS is a crystalline material, and Cu, Cl, Mn, and Te are each independently an activator and/or a coactivator. A phosphor including Cu or Cl independently as activators, or a phosphor including only Cu and Cl as a coactivators, emits only green light or blue light. However, a phosphor including, in addition to Cu and Cl, Mn and Te in a selected ratio, may emit red light.

For example, a $Cu_xS$ or $Cu_xTe$ phase, which may cause electroluminescence, may exist in conjunction with or within the phosphor, and a high electric field may be formed at an interface between the $Cu_xS$ or $Cu_xTe$ phase and a ZnS phase when a voltage is applied thereto. The high interfacial electric field may cause an electron to be instantly injected from the $Cu_xS$ or $Cu_xTe$ phase into the ZnS phase by a tunneling effect, and then the electron may collide with Mn and emit a visible ray having a wavelength corresponding to red light.

An emission spectrum peak wavelength of the phosphor, obtained by applying an electric field, may be about 650 nanometers (nm), specifically about 640 to about 660 nm, more specifically about 630 to about 670 nm. Thus, the phosphor may emit red light having excellent color purity. The light emitted by the phosphor may have a CIE x value of about 0.6 to about 0.65, specifically about 0.61 to about 0.64, more specifically about 0.62 to about 0.63, and a CIE y value of about 0.35 to about 0.4, specifically 0.36 to about 0.39, more specifically 0.37 to about 0.38 in terms of CIE color coordinates. The phosphor may used as a red phosphor in an electroluminescent device.

The phosphor may be used as a photoluminescent phosphor. The phosphor of Formula 1 may be excited by an excitation light source, such as an excitation light source providing ultra violet rays, and may emit red light.

The phosphor of Formula 1 may be used as a yellow phosphor by appropriate selection of the molar ratios of Mn and Te. For example, a phosphor represented by Formula 3 may be used as a yellow photoluminescent phosphor or as a yellow electroluminescent phosphor:

    $ZnS:Cu_v,Cl_w,Mn_x,Te_y$,    Formula 3 wherein $0<v<0.05$, $0<w<0.05$, $0.01 \leq x \leq 0.1$, and $0<y<0.0008$. In an embodiment $0.0001<v<0.04$, $0.0001<w<0.04$, $0.02 \leq x \leq 0.09$, and $0.0001<y<0.0007$. In yet another embodiment, $0.001<v<0.03$, $0.001<w<0.03$, $0.03 \leq x \leq 0.08$, and $0.001<y<0.0006$.

A white light emitting device according an embodiment includes the phosphor of Formula 1, the phosphor of Formula 3, or a combination comprising at least one of the foregoing. The white light emitting device may be a dispersion type electroluminescent device. Alternatively, the white light emitting device may be a stacked electroluminescent device. The white light emitting device is not particularly limited. Any white light emitting device that is used in the art may be used as the white light emitting device. For example, the white light emitting device may be a white light emitting device used in a thin film electroluminescent device or a hybrid electroluminescent device. Because the phosphor may be a photoluminescent phosphor, the phosphor may be also used in any of various light emitting devices wherein the phosphor excited by a separate excitation light source.

The dispersion type electroluminescent device may further include a blue phosphor and a green phosphor. In an embodiment, an active type light emitting device comprises the phosphor of Formula 1, the phosphor of Formula 3, the blue phosphor, the green phosphor, or a combination comprising at least one of the foregoing.

Because a red electroluminescent phosphor is not commercially available, a commercially available dispersion type electroluminescent device uses a photoluminescent phosphor or dye that is capable of emitting red light. However, because the disclosed white light emitting device uses a red electroluminescent phosphor, a separate light source can be omitted in the white light emitting device. Thus, the structure of the electroluminescent device may be simplified.

The blue phosphor may comprise ZnS:Tm, F; SrS:Ce; $(Zn_{1-x}, Sr_x)S:Ce(0<x<1)$; $CaGa_2S_4$:Ce; ZnS:Cu, Cl; ZnS:Cu, I; or a combination comprising at least one of the foregoing, but is not limited thereto. Any blue phosphor that is used in an electroluminescent device may be used as the blue phosphor.

The green phosphor may comprise ZnS:Cu, Al; ZnS:Tb, F; CaS:Ce; or a combination comprising at least one of the foregoing, but is not limited thereto. Any green phosphor that is used in an electroluminescent device may be used as the green phosphor.

In the disclosed white light emitting device the phosphor of Formula 1 may have an emission spectrum peak wavelength of about 600 to about 630 nm, specifically about 605 to about 625 nm, more specifically about 610 to about 620 nm, the blue phosphor may have an emission spectrum peak wavelength of about 430 to about 470 nm, specifically about 435 to about 465 nm, more specifically about 440 to about 460 nm and the green phosphor may have an emission spectrum peak wavelength of about 510 to about 550 nm, specifically about 515 to about 545 nm, more specifically about 520 to about 540 nm. The phosphor of Formula 1 may emit red light having a wavelength of about 650 nm, specifically about 640 to about 660 nm, more specifically about 630 to about 670 nm, and thus an active type white light emitting device may comprise a combination of the red, blue, and green phosphors.

The white light emitting device may be a signal lamp, a communications device, a backlight of a display device, or an illumination device, but is not limited thereto. The white light emitting device may be used in various locations.

FIG. 1 is a schematic diagram of an exemplary embodiment of an alternating current dispersion type electroluminescent device (herein referred to as an "electroluminescent device"). In the electroluminescent device, a transparent electrode 20 is disposed on a substrate 10, a first dielectric layer 30 is disposed on the transparent electrode 20, an emissive layer 40 is disposed on the first dielectric layer 30, a second dielectric layer 50 is disposed on the emissive layer 40, and an upper electrode 60 is disposed on the second dielectric layer 50. When an electric field is generated by supplying an alternating current ('AC") between the upper electrode 60 and the transparent electrode 20, light generated by a phosphor, which is included in the emissive layer 40, is emitted out of the electroluminescent device through the transparent electrode 20. The first dielectric layer 30 may be omitted.

The electroluminescent device is not limited to the structure of FIG. 1, and may have any structure in which a phosphor emits light in response to an electric field. For example, the electroluminescent device may have a structure in which a separate dielectric layer is not used, and instead a metal oxide is coated on a phosphor.

The substrate 10 may comprise any transparent material that is used to form a substrate, but is not particularly limited. The substrate 10 may comprise, for example, silica, glass, a polyethylene terephthalate ("PET"), plastic, or a combination comprising at least one of the foregoing. The polyethylene terephthalate may be in the form of a film. A flexible electroluminescent device may be manufactured when a flexible material, such as a PET film, is used to form the substrate 10.

The transparent electrode 20 may comprise a metal oxide, a conductive copolymer, a nanostructured material, a crystalline material, or a combination comprising at least one of the foregoing, but is not limited thereto. The transparent electrode 20 may comprise any material that is used in the art to form a transparent electrode.

Examples of the metal oxide may include an indium tin oxide ("ITO"), an indium zinc oxide ("IZO"), InSnO, ZnO, $SnO_2$, NiO, $Cu_2SrO_2$, or a combination comprising at least one of the foregoing.

Examples of the conductive copolymer may include polydiphenylacetylene, poly(t-butyl)diphenylacetylene, poly(trifluoromethyl)diphenylacetylene, poly(bistrifluoromethyl)acetylene, polybis(T-butyldiphenyl)acetylene, poly(trimethylsilyl)diphenylacetylene, poly(carbazole)diphenylacetylene, polydiacetylene, polyphenylacetylene, polypyridineacetylene, polymethoxyphenylacetylene, polymethylphenylacetylene, poly(t-butyl)phenylacetylene, polynitrophenylacetylene, poly(trifluoromethyl)phenylacetylene, poly(trimethylsilyl)phenylacetylene, a combination comprising at least one of the foregoing, or a derivative thereof. In addition, examples of the conductive copolymer may include polyaniline, polythiophene, polypyrole, polysilane, polystyrene, polyfuran, polyindole, polyazulene, polyphenylene, polypyridine, polybipyridine, polyphthalocyanine, polyphenylenevinylene, a mixture of polyethylenedioxythiophene ("PEDOT") and polystyrenesulfonate ("PSS"), a combination comprising at least one of the foregoing, or a derivative thereof.

Each of the first dielectric layer 30 and the second dielectric layer 50 may comprise a metal oxide having an electrical resistivity equal to or greater than $10^5$ Ωcm, specifically about $10^5$ to about $10^{10}$ Ωcm, more specifically about $10^6$ to about $10^9$ Ωcm, but are not limited thereto. Any material that is used to form a dielectric layer in the art may be used to form the first dielectric layer 30 and the second dielectric layer 50. For example, $SiO_2$, $Al_2O_3$, $BaTiO_3$, $TiO_2$, or a combination comprising at least one of the foregoing may be used to form each of the first and second dielectric layers 30 and 50, respectively.

The emissive layer 40 may include the phosphor of Formula 1. In addition, the emissive layer 40 may comprise a crystalline material including an activator. The crystalline material may be a material having a large band gap. The crystalline material may be excited by a high electric field, and may have a lattice accommodating an activator for emitting visible rays. The crystalline material may be a compound including a Group 12-16 compound, a Group 13-15 compound, a Group 14-14 compound, or a mixture comprising at least one of the foregoing, wherein Group refers to a group of the periodic table of the elements, but is not limited thereto. Any material that is included in a crystalline material may be used as the crystalline material. The crystalline material may be selected according to its emission wavelength. Examples of the crystalline material may include ZnS, ZnSe, GaAs, GaAlAs, GaAsP, AlGaInP, AlAs, GaP, AlP, SiC, GaN, GaInN, GaAlN, or a combination comprising at least one of the foregoing. The activator may comprise one or more activators (e.g. an activator and a coactivator) that is used in the art, and is not particularly limited. For example, the activator may comprise Br, I, Ag, or a combination comprising at least one of the foregoing.

The phosphor may be coated with a metal oxide, and the metal oxide may form a dielectric layer. In an embodiment wherein the phosphor is coated with the metal oxide, the lifetime of the electroluminescent device may increase.

The upper electrode 60 may comprise a metal or a conductive oxide, but is not limited thereto. Any conductive material may be used to form the upper electrode 60. For example, the upper electrode 60 may comprise nickel (Ni), platinum (Pt), gold (Au), silver (Ag), iridium (Ir), aluminum (Al), or a combination comprising at least one of the foregoing.

The transparent electrode 20, the first and second dielectric layers 30 and 50, respectively, the emissive layer 40, and the upper electrode 60 may be manufactured using a method that is used in the art, such as a printing method, a sputtering method, or a chemical vapor deposition ("CVD") method.

For example, the emissive layer 40 may be manufactured as follows. First, a phosphor paste, in which a phosphor and a resin are mixed in a ratio of about 1:99 to about 99:1, specifically about 1:98 to about 98:1, more specifically about 1:90 to about 90:1, is prepared. In an embodiment, each of a red, green, and blue phosphor paste are prepared. The emissive layer 40 may be manufactured by sequentially printing the red, green, and blue phosphor pastes on the transparent electrode 20, or by printing a mixed phosphor paste prepared by mixing the red, green, and blue phosphor pastes on the transparent electrode 20. The emissive layer 40 may have a thickness of about 0.1 to about 10000 μm, specifically about 1 to about 1000 μm, more specifically about 10 to about 100 μm. The resin, which is mixed with the phosphor, is not particularly limited, and may be any resin that is used in the art, such as a cyanoethyl pullulan resin.

According to an embodiment, a method of preparing a phosphor includes mixing a copper and chlorine activated zinc sulfide phosphor, a manganese precursor, and a tellurium precursor to obtain a first mixture, sintering the first mixture; pulverizing the sintered first mixture to form a pulverized material; and mixing the pulverized material and a first copper precursor to obtain a second mixture, and sintering the second mixture to form the phosphor.

The copper and chlorine activated zinc sulfide phosphor may be a green or blue phosphor. A phosphor for emitting red light is prepared by mixing and sintering the copper and chlorine activated zinc sulfide phosphor, the manganese precursor, and the tellurium precursor. A phosphor prepared by the sintering of the first mixture may be washed with a hydrochloric acid solution and a KCN solution, and may be dried for about 5 to about 15 hours, specifically about 6 to about 14 hours, more specifically about 7 to about 13 hours, at a temperature of about 50 to about 100° C., specifically about 55 to about 90° C., more specifically about 60 to about 80° C. A phosphor prepared by the sintering of the second mixture may emit red light having a high color purity upon application of an electric field.

In the method of preparing the phosphor, the sintering of the first mixture and the sintering of the second mixture may be performed in an airtight space. The airtight space may be a hermetically sealed container. The hermetically sealed container may comprise quartz, but is not limited thereto. Any container that may withstand a temperature equal to or greater than about 100° C., specifically about 150° C., more specifically about 200° C. may be used as the hermetically sealed container.

The airtight space may be in a vacuum state. For example, an internal pressure of the hermetically sealed container may correspond to a vacuum state. For example, a vacuum of about $10^{-6}$ to about $10^{-1}$ Torr, specifically about $10^{-5}$ to about $10^{-2}$ Torr, more specifically about $10^{-4}$ to about $10^{-3}$ Torr may be used. In an embodiment, the pressure in the hermetically sealed container may be about $10^{-6}$ to about $10^{-1}$ Torr, specifically about $10^{-5}$ to about $10^{-2}$ Torr, more specifically about $10^{-4}$ to about $10^{-3}$ Torr.

The copper and chlorine activated zinc sulfide phosphor used in the method of preparing the phosphor may be prepared using a method including mixing zinc sulfide, a second copper precursor and a flux to form a mixture of the zinc sulfide, the second copper precursor and the flux, and drying the mixture of the zinc sulfide, the second copper precursor and the flux to form a dried mixture; mixing the dried mixture and a sulfur powder, and sintering the mixture of the dried mixture and the sulfur powder to form the copper and chlorine activated zinc sulfide phosphor. The copper and chlorine activated zinc sulfide phosphor may be a green or blue phosphor.

The manganese precursor used in the method of preparing the phosphor may comprise Mn, MnTe, MnS, $MnCO_3$, or a combination comprising at least one of the foregoing, but is not limited thereto. Any precursor that is used to prepare manganese using a sintering operation in the art may be used as the manganese precursor.

The tellurium precursor used in the method of preparing the phosphor may comprise Te, CuTe, MnTe, or a combination comprising at least one of the foregoing, but is not limited thereto. Any precursor that is used to prepare tellurium by using a sintering operation in the art may be used as the tellurium precursor.

The first copper precursor used in the method of preparing the phosphor may comprise $CuSO_4.5H_2O$, $CuSO_4$, Cu, CuS, or a combination comprising at least one of the foregoing, but is not limited thereto. Any precursor that is commonly used to provide copper using a sintering operation in the art may be used as the copper precursor.

The second copper precursor used in the method of preparing the phosphor may comprise $CuSO_4.5H_2O$, $CuSO_4$, Cu, CuS, or a combination comprising at least one of the foregoing, but is not limited thereto. Any precursor that is used to provide copper using a sintering operation in the art may be used as the copper precursor.

The flux used in the method of preparing the phosphor may comprise $MgCl_2$, $BaCl_2$, NaCl, or a combination comprising at least one of the foregoing, but is not limited thereto. Any material including chlorine that is used to increase a particle size of a phosphor and is prepared using a sintering operation in the art may be used as the flux.

In the method of preparing the phosphor, the sintering of the first mixture may be performed for about 1 hour to about 100 hours, specifically for about 3 to about 6 hours, more specifically for about 5 hours at a temperature of about 900 to about 1200° C., specifically about 950 to about 1150° C., more specifically about 1000 to about 1100° C. When the sintering temperature is less than 900° C., a phosphor that may emit red light may not be prepared in the sintering of the first mixture. In addition, in the sintering of the first mixture, if Te reacts with an impurity, such as oxygen or hydrogen, yellow light emission due to Mn may not be transited to red light emission.

In the method of preparing the phosphor, the sintering of the second mixture may be performed for about 1 hour to about 100 hours, specifically for about 3 to about 6 hours, more specifically for about 5 hours at a temperature of about 650 to about 850° C., specifically about 675 to about 825° C., more specifically about 700 to about 800° C. Because the sintering of the second mixture may change a phase of the phosphor from a hexagonal phase to a cubic phase, the sintering of the second mixture may be performed at a temperature in the foregoing temperature range. In an embodiment, a sintering temperature may be, for example, of about 700 to about 800° C.

In the disclosed method of preparing the phosphor, the sintering operation for preparing the copper and chlorine activated zinc sulfide phosphor may be performed for about 1 hour to about 100 hours, specifically for about 3 to about 6 hours, more specifically for about 5 hours at a temperature of about 1050 to about 1150° C., specifically about 1075 to about 1125° C., more specifically about 1100° C. A phosphor of ZnS:Cu, Cl may be prepared in the sintering operation.

Hereinafter, one or more embodiments will be described in detail with reference to the following examples. However, these examples are not intended to limit the purpose or scope of the embodiments.

Preparation of Phosphor

Example 1

Preparation of Zns:Cu, Cl Phosphor

A 40 g quantity of zinc sulfide (ZnS), $CuSO_4 \cdot 5H_2O$ corresponding to 0.01 mole percent (mol %), based on the total moles of ZnS and copper sulfide (CuS), and 6 g of a flux (2.3 g of magnesium chloride, 2.3 g of barium chloride, and 1.4 g of sodium chloride) were mixed to form a mixture, distilled water was added to the mixture, and then the mixture was stirred sufficiently to form a solution. Then, this solution was dried at 130° C. for 12 hours to form a dried powder. A mixed powder was prepared by adding 2 g of sulfur powder to this dried powder and then stirring the mixed powder. A phosphor of ZnS:Cu, Cl as synthesized by putting the mixed powder in a quartz tube and then sintering the mixed powder at 1100° C. for 3 hours. The phosphor of ZnS:Cu, Cl was sequentially washed with distilled water three times, a diluted hydrochloric acid solution one time, distilled water three times, a KCN solution two times, and distilled water three times, and was dried at 80° C.

First Heating Operation

A mixture was obtained by simultaneously adding Mn metal and Te metal to the ZnS:Cu, Cl phosphor of Example 1, prepared above in the preparation of the ZnS:Cu, Cl phosphor, in a molar ratio of ZnS:Mn:Te of 94.6:5:0.4, and stirring the resulting mixture sufficiently. A phosphor of ZnS:Cu, Cl, Mn, Te comprising a hexagonal phase was synthesized by putting the mixture in a quartz tube having a vacuum atmosphere of about $10^{-3}$ to about $10^{-4}$ Torr, hermetically sealing the quartz tube using an oxygen-propane torch, and then sintering the mixture for 3 hours at 1000° C. The phosphor of ZnS:Cu, Cl, Mn was sequentially washed with distilled water three times, a diluted hydrochloric acid solution one time, distilled water three times, a KCN solution two times, and distilled water three times, and was dried at 80° C.

Second Heating Operation

A mixture was obtained by mechanically milling the phosphor prepared in the first heating operation in a mortar in a glove box for about one hour, further adding Cu metal corresponding to 7 mol %, based on the total moles of the phosphor prepared in the first heating operation and Cu metal, and then stirring the mixture for 10 minutes. A phosphor of ZnS:Cu, Cl, Mn, Te in a cubic phase was synthesized by putting the mixture in a quartz tube having a vacuum atmosphere of about $10^{-3}$ to about $10^{-4}$ Torr, hermetically sealing the quartz tube using an oxygen-propane torch, and then sintering the mixture for 3 hours at 800° C. The phosphor of ZnS:Cu, Cl, Mn, Te was sequentially washed with distilled water three times, a diluted hydrochloric acid solution one time, distilled water three times, a KCN solution two times, and distilled water three times, and was dried at 80° C. In the phosphor of ZnS:Cu, Cl, Mn, Te, a molar ratio of ZnS:Mn:Te is 1.0:0.05285:0.00423.

Reference Example 1

A phosphor was prepared in the same manner as in Example 1 except that Te was added to the phosphor of ZnS:Cu, Cl in a molar ratio of ZnS:Mn:Te of 94.93:5:0.07. In the phosphor of Reference Example 1, a molar ratio of ZnS:Mn:Te was 1.0:0.05267:0.00074.

Reference Example 2

A phosphor was prepared in the same manner as in Example 1 except that Te was added to the phosphor of ZnS:Cu, Cl in a molar ratio of ZnS:Mn:Te of 94.964:5:0.036. In the phosphor of Reference Example 2, a molar ratio of ZnS:Mn:Te was 1.0:0.05265:0.00066.

Preparation of Electroluminescent Device

Example 2

A transparent electrode having a thickness of 1500 Å was formed by coating indium tin oxide ("ITO") on a glass substrate (soda line glass) having a thickness of 1.8 millimeters (mm) using a sputtering method. A 5 g quantity of the phosphor prepared in Example 1 and 5 g of cyano resin (available from shin-Etsu chemical Co., Ltd. CR-M grades of polymer type) were mixed using a softener. An emissive layer having a thickness of 25 μm was formed by spin-coating this mixture at a speed of 1000 revolutions per minute (rpm), and was dried in an electric oven for 30 minutes at 130° C. Then, a dielectric layer was formed by coating $SiO_2$ to a thickness of 3000 Å on the emissive layer by using a plasma chemical vapor deposition method ("PECVD"), and then an upper electrode was formed by coating aluminum (Al) to a thickness of 1500 Å on the dielectric layer by using a sputtering method and drying the resultant at 130° C. for 30 minutes, thereby completing the preparation of a dispersion type electroluminescent device.

Reference Example 3

A distributed electroluminescence device was prepared in the same manner as in Example 2 except that the phosphor prepared in Reference Example 1 was used instead of the phosphor prepared in Example 1.

Reference Example 4

A dispersion type electroluminescent device was prepared in the same manner as in Example 2 except that the phosphor prepared in Reference Example 2 was used instead of the phosphor prepared in Example 1.

Evaluation Example 1

Evaluation of Electroluminescent Spectrum

Figure 2:
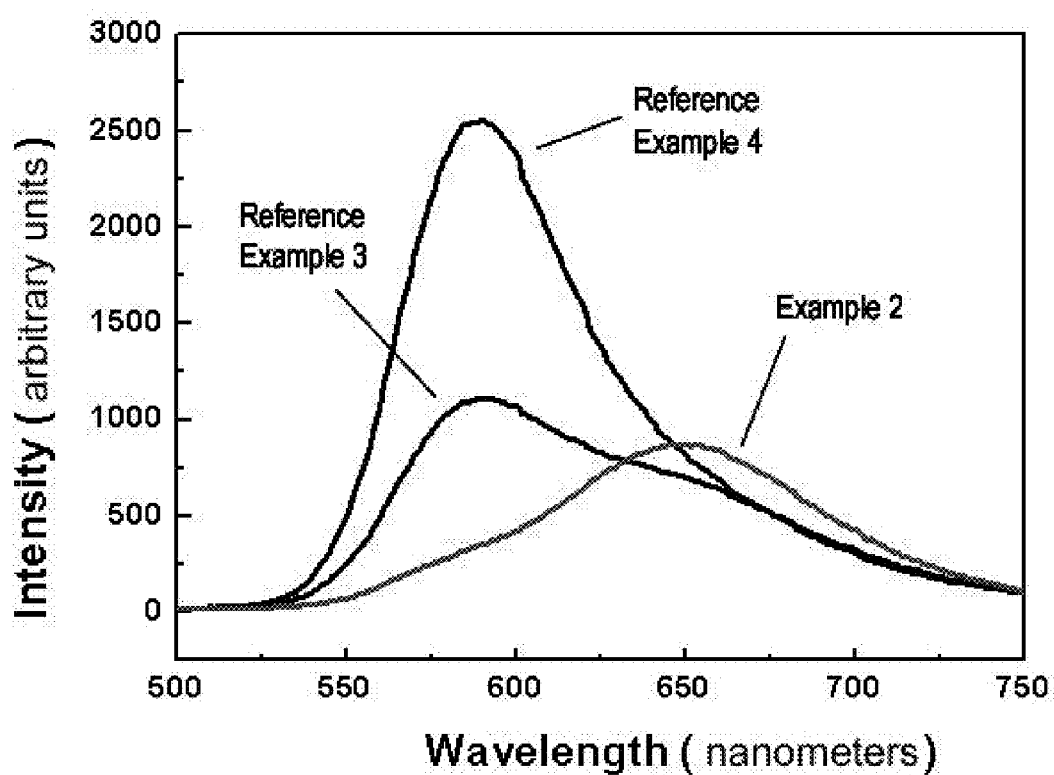
FIG. 2 is a graph of intensity (arbitrary units, a.u.) versus wavelength (nanometers, nm) showing electroluminescent spectra of electroluminescent devices prepared in Example 2 and Reference Examples 3 and 4.

Electroluminescent spectra of the electroluminescent devices prepared in Example 2 and Reference Examples 3 and 4 were measured. A current and a voltage applied between a transparent electrode and an upper electrode, which are connected, were measured using an oscilloscope (Agilent, infiniium oscilloscope), and the brightness of each electroluminescent device was measured by a luminance colorimeter (TOPCON, BM-7). A frequency and a voltage used in the measurement were 400 hertz (Hz) and 100 volts (V), respectively. A measured result is shown in FIG. 2.

As shown in Table 2, the electroluminescent device prepared in Example 2 exhibited a red emission peak around 650 nm. On the other hand, the electroluminescent devices prepared in Reference Examples 3 and 4 exhibited a yellow emission peak around 580 nm.

Evaluation Example 2

Evaluation of CIE Color Coordinates Properties

The CIE color coordinates of light emitted from the electroluminescent devices prepared in Example 2 and Reference Examples 3 and 4 were evaluated. An evaluated result is shown in FIG. 3.

Figure 3:
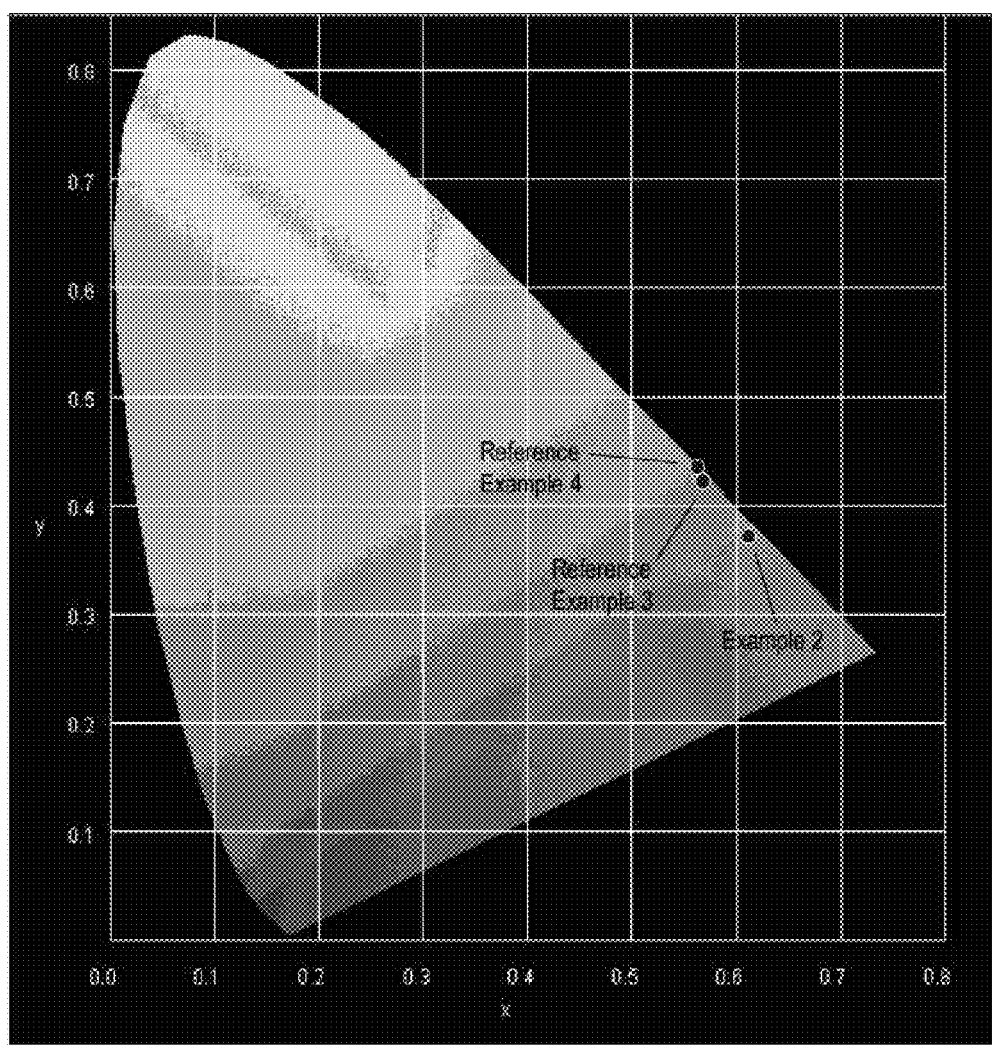
FIG. 3 is a graph of CIE y versus CIE x showing color coordinates of light emitted from the electroluminescent devices prepared in Example 2 and Reference Examples 3 and 4.

As shown in FIG. 3, the electroluminescent device prepared in Example 2 exhibited a red color corresponding to CIE coordinates (0.6079, 0.3724). However, the electroluminescent devices prepared in Reference Examples 3 and 4 exhibited yellow colors corresponding to CIE coordinates (0.5647, 04224) and (0.5598, 0.4346), respectively.

As further described above, according to an embodiment, an electroluminescent device may emit red light due using a new phosphor.

It should be understood that the exemplary embodiments described therein should be considered in a descriptive sense only and not for purposes of limitation.

Descriptions of features or aspects within each embodiment should be considered as available for other similar features or aspects in other embodiments.

What is claimed is:

1. A red phosphor represented by Formula 1:

$$ZnS:Cu,Cl,Mn,Te. \qquad \text{Formula 1}$$

2. The phosphor of claim 1, wherein the phosphor is represented by Formula 2:

$$ZnS:Cu_v,Cl_w,Mn_x,Te_y, \qquad \text{Formula 2}$$

wherein $0<v<0.05$, $0<w<0.05$, $0.01 \leq x \leq 0.1$, and $0.0008 \leq y \leq 0.03$.

3. The phosphor of claim 2, wherein $0.02<x<0.08$, and $0.002<y<0.02$.

4. A white light emitting device comprising:
a red phosphor of Formula 1:

$$ZnS:Cu,Cl,Mn,Te. \qquad \text{Formula 1}$$

5. The white light emitting device of claim 4, wherein the white light emitting device is a dispersion type electroluminescent device.

6. The white light emitting device of claim 5, wherein the electroluminescent device comprises a blue phosphor and a green phosphor.

7. The white light emitting device of claim 6, wherein the blue phosphor comprises ZnS:Tm, F; SrS:Ce; $(Zn_{1-x}, Sr_x)S$:Ce($0<x<1$); CaGa$_2$S$_4$:Ce; ZnS:Cu, Cl; ZnS:Cu, I; or a combination comprising at least one of the foregoing.

8. The white light emitting device of claim 6, wherein the green phosphor comprises ZnS:Cu, Al; ZnS:Tb, F; CaS:Ce; or a combination comprising at least one of the foregoing.

9. The white light emitting device of claim 6, wherein the phosphor of claim 1 has an emission spectrum peak wavelength of about 600 to about 630 nanometers,
wherein the blue phosphor has an emission spectrum peak wavelength of about 430 to about 470 nanometers, and
wherein the green phosphor has an emission spectrum peak wavelength of about 510 to about 550 nanometers.

10. The white light emitting device according to claim 4, wherein the white light emitting device is a signal lamp, a communications device, a backlight of a display device, or an illumination device.

11. A method of preparing a phosphor, the method comprising:
mixing a copper and chlorine activated zinc sulfide phosphor, a manganese precursor, and a tellurium precursor to obtain a first mixture,
sintering the first mixture;
pulverizing the sintered first mixture to form a pulverized material;
mixing the pulverized material and a first copper precursor to obtain a second mixture; and
sintering the second mixture to form the phosphor.

12. The method of claim 11, wherein the sintering of the first mixture and the sintering of the second mixture are performed in an airtight space.

13. The method of claim 12, wherein the airtight space comprises a gas having a pressure of about $10^{-5}$ to about $10^{-2}$ Torr.

14. The method of claim 11, wherein the copper and chlorine activated zinc sulfide phosphor is prepared by a method comprising:
mixing zinc sulfide, a second copper precursor, and a flux to form a mixture of the zinc sulfide, the second copper precursor, and the flux;
drying the mixture of the zinc sulfide, the second copper precursor and a flux to form a dried mixture;
mixing the dried mixture and a sulfur powder; and
sintering the mixture of the dried mixture and the sulfur powder to form the copper and chlorine activated zinc sulfide phosphor.

15. The method of claim 11, wherein the manganese precursor comprises Mn, MnTe, MnS, MnCO$_3$, or a combination comprising at least one of the foregoing.

16. The method of claim 11, wherein the tellurium precursor comprises Te, CuTe, MnTe, or a combination comprising at least one of the foregoing.

17. The method of claim 14, wherein the second copper precursor comprises CuSO$_4$.5H$_2$O, CuSO$_4$, Cu, CuS, or a combination comprising at least one of the foregoing.

18. The method of claim 14, wherein the flux comprises MgCl$_2$, BaCl$_2$, NaCl, or a combination comprising at least one of the foregoing.

19. The method of claim 11, wherein the sintering of the first mixture is performed for about 3 to about 6 hours at a temperature of about 900 to about 1200° C.

20. The method of claim 11, wherein the sintering of the second mixture is performed for about 3 to 6 hours at a temperature of about 600 to about 800° C.

21. The method of claim 14, wherein the sintering is performed for about 3 to 6 hours at a temperature of about 1050 to about 1150° C.

22. The method of claim 11, wherein the first copper precursor comprises CuSO$_4$.5H$_2$O, CuSO$_4$, Cu, CuS, or a combination comprising at least one of the foregoing.

* * * * *